United States Patent [19]

Kaneko

[11] Patent Number: 4,656,645
[45] Date of Patent: Apr. 7, 1987

[54] RADIO COMMUNICATION SYSTEM
[75] Inventor: Kunio Kaneko, Tokyo, Japan
[73] Assignee: NEC Corporation, Tokyo, Japan
[21] Appl. No.: 718,515
[22] Filed: Apr. 1, 1985
[30] Foreign Application Priority Data Apr. 2, 1984 [JP] Japan .................................. 59-63195

[51] Int. Cl.⁴ ............................................... H04B 7/02
[52] U.S. Cl. ...................................... 375/40; 375/122; 340/825.01
[58] Field of Search ....................... 375/34, 40, 58, 38, 375/99, 100, 122; 455/8.59; 333/3, 100, 101; 371/67, 68; 370/16, 84, 118; 340/825.01; 381/29, 30, 31

[56]  References Cited
U.S. PATENT DOCUMENTS

| 3,124,654 | 3/1964 | Raisbeck | 381/29 |
| 3,310,742 | 3/1967 | Adams | 375/40 |
| 3,534,264 | 10/1970 | Blasbalg et al. | 375/34 |
| 3,536,840 | 10/1970 | Sullivan | 375/58 |
| 3,541,266 | 10/1970 | Klayman et al. | 381/29 |
| 3,548,309 | 12/1970 | Saltzberg et al. | 375/58 |
| 3,935,391 | 1/1976 | Weir et al. | 370/84 |
| 4,417,348 | 11/1983 | Abbruscato | 375/40 |
| 4,442,518 | 4/1984 | Morimoto | 370/16 |

OTHER PUBLICATIONS

"Transmission Systems for Communications" (Fifth edition, 1982) by Members of the Technical Staff, Bell Laboratories.
"Data Transmission" by William R. Bennett et al, Bell Telephone Laboratories.
"Microwave Communication" edited by S. Yonezawa et al, 1963.

Primary Examiner—Robert L. Griffin
Assistant Examiner—Stephen Chin
Attorney, Agent, or Firm—Laff, Whitesel, Conte & Saret

[57]  ABSTRACT

A radio communication system comprises transmitting and receiving stations, a plurality of transmission channels comprising regular and spare channels linking the stations, and a channel monitor for monitoring the status of the respective channels. When the respective transmission channels are in normal conditions, data signal is transmitted by making use of not only the regular channel but also the spare channel. On the other hand, when a failure of any one of the transmission channels is detected by the channel monitor, data signal subject to band compression is transmitted via the non-failed channel. The communication system thus configured makes it possible to effectively utilize a spare channel for effecting high quality signal transmission, while maintaining the essential function of the spare channel, this providing an improved utilization of transmission channel.

11 Claims, 2 Drawing Figures

RADIO COMMUNICATION SYSTEM

BACKGROUND OF THE INVENTION

The present invention relates to a radio communication system, and more particularly to an improvement in effective utilization of a spare channel or protection channel widely employed in a radio relay system.

In radio relay systems, there has been a widely used provision of a spare channel for the purpose of avoiding a channel break due to equipment failure or fading. A typical example of the communication system provided with the spare channel is shown in FIG. 1.

This communication system comprises a transmitting station 30, a receiving station 40, a regular channel 11 and a spare channel 12 linking the stations 30 and 40 in a parallel fashion wherein the signal is transmitted through the respective signal transmission channels 11 and 12 based on the radio relay system. The transmitting station 30 comprises an input terminal 1 for receiving an incoming signal, and a branch circuit 2 for distributing the incoming signal to the respective channels 11 and 12. The receiving station 40 comprises a channel monitor 22 comprised of a logic circuit which is responsive to information $f_{m1}$ and $f_{m2}$ that indicates the status of the respective channels 11 and 12 to produce a select command $f_s$ for selecting a signal routing from the regular channel 11 or a signal routing from the spare channel 12. The selector 23 is comprised of a switch circuit responsive to the select command $f_s$ to select either of the signals routing from both the channels 11 and 12. An output terminal 21 delivers the thus selected signal.

When the channel monitor 22 recognizes that the regular channel 11 is in a normal condition i.e. has not failed, the selector 23 becomes operative to allow the signal routing through the signal carrying channel 11 to be delivered from the output terminal 21. In this case, the spare channel 12 does not substantially contribute to the signal transmission. On the other hand, when the channel monitor 22 recognizes that the regular channel 11 has failed, the selector 23 becomes operative to allow the signal routed through the spare channel 12 to be delivered from the output terminal 21. In such a dual channel system, transmission identical to that stated above can obviously be effected even if the roles of channels 11 and 12 are reversed so as to be a spare channel and a regular channel, respectively.

As understood from the configuration shown in FIG. 1, the provision of the spare channel is advantageous from a viewpoint of improving the reliability of the transmission channel. However, from a viewpoint of effective utilization of radio frequency, this system is not advantageous in that the spare channel does not substantially contribute to transmission in the normal condition where the incoming signal is transmitted via the regular channel.

Meanwhile, in recent years, band compression techniques for effective transmission of digital signals have been remarkably developed. With the band compression technique, transmission speed is lowered to a value close to the critical lower most speed limit which is necessary for assuring validity of a desired transmission quality. However, it is of course desirable to effect transmission having a higher quality within a speed range which can be tolerated by the transmission channel.

As previously stated, a spare channel based on the conventional radio relay system is substantially identical to an idle channel. Accordingly, in the case where both the regular channel and the spare channel are in normal conditions, the system normally has a transmission capacity two times larger than that in case of only the regular channel. Namely, only when the regular channel has failed, the spare channel is utilized as a working channel. Conversely, when neither the regular nor the spare channels has failed, the spare channel becomes idle and is not utilized. This is a problem from a viewpoint of efficient utilization of transmission channel.

SUMMARY OF THE INVENTION

In view of the above, an object of the present invention is to provide a radio communication system having an improved effective utilization of transmission channel capacity.

Another object of the invention is to provide a radio communication system which has effectively improved the utilization of a transmission channel by making use of band compression techniques.

A further object of the invention is to provide a radio communication system which can additionally utilize a spare channel in normal conditions for effecting a transmission of a high quality signal which is not subject to the band compression.

Thus, when neither a regular channel nor a spare channel has failed, the system makes it possible to effect transmission by making use of not only the regular channel but also the spare channel. When the regular channel has failed, the system makes it possible to effect transmission by making use of the spare channel.

According to the present invention, there is provided a radio communication system comprising a transmitting station for receiving an input digital signal and for transmitting it. A receiving station receives a transmitted signal and delivers it. First and second transmission channels link the transmitting and receiving stations. Band compression means is provided at the transmitting station, for compressing by half the transmission speed of the digital signal. A converter means is provided at the transmitting station, for converting the input digital signal into two digital signals each being halved in transmission speed. A switching means is responsive to the status of the first and second transmission channels to effect a switchover between a first transmission mode for transmission of the output of the band compression means and a second transmission mode for transmission of the outputs of the converter means.

According to an embodiment of the present invention, there is provided a radio communication system comprising: transmitting and receiving stations for a digital signal; an n number of signal transmission channels linking the stations (n is a positive integer equal to or more than two), the transmission channels being assigned to at least one regular channel and one spare channel; channel monitor means for monitoring whether at least one of the transmission channels has failed or not; first selector means provided at the receiving station and responsive to a first command from the channel monitor means to select digital signal routing via each of non-failed transmission channels; first means provided at the transmitting station to implement a band compression to the digital signal received in the transmitting station in a manner such that its transmission speed is reduced on one q-th ($2 \leq q \leq n$); second means provided at the transmitting station to convert the received digital signal into the q number of digital signals each having one q-th of the transmission speed; second selector means provided at the transmitting station and responsive to a second command from the channel monitor means to effect a selective operation for routing the q number of digital signal from the second means to the respective transmission channels or for routing the band-compressed digital signal from the first means to the respective transmission channels; and third means provided at the receiving station to combine together respective digital signals which have been routed via the transmission channels; whereby when the channel monitor means recognizes that none of the transmission channels has failed and delivers the second command to the second selector means to make the q number of digital signals route to the transmission channels, thereby to combine together the q number of digital signals which have been routed via the transmission channels in the third means, then delivering the digital signal thus combined from the receiving station. When the monitor means recognizes that at least one of the transmission channels has failed, it is operative to deliver the second command to the second selector means to make the band-compressed digital signal route from the first means to the q number of signal transmission channels and to deliver the first command to the first selector means, to select the band-compressed digital signl routing from each of the non-failed transmission channels in the first selector means, then delivering the band-compressed signal thus selected from the receiving station.

The transmitting station may include a branch circuit for branching the received digital signal into the first means and the second means.

The first means may be comprised of a band compression circuit and the second means may be comprised of a converter for converting an input signal to a q number of outputs. The channel monitor means may be comprised of a logic circuit responsive to status signals from the n number of signal transmission channels to produce the first and second commands.

Each of the first and second selector means may be comprised of a switchover circuit.

The radio communication system may further comprises an additional signal transmission channel for routing of the second command to the second selector means in a direction opposite to that of each digital signal routing via the signal transmission channels, when the channel monitor means is provided at the receiving station.

When the transmitting station includes a branch circuit for branching of an analog signal into the first and second means, each of the first and second means may be further provided at its initial stage with an analog-to-digital converter for deriving the digital signal.

Each of the first selector means and the third means may be provided at its final stage with a digital-to-analog converter.

BRIEF DESCRIPTION OF THE DRAWINGS

The features and advantages of a radio communication system according to the present invention will become more apparent from the following description taken in conjunction with the accompanying drawings, in which.

DETAILED DESCRIPTION OF PREFERRED EMBODIMENT

A preferred embodiment of a radio communication system according to the present invention will be described with reference to attached drawings.

Figure 2:
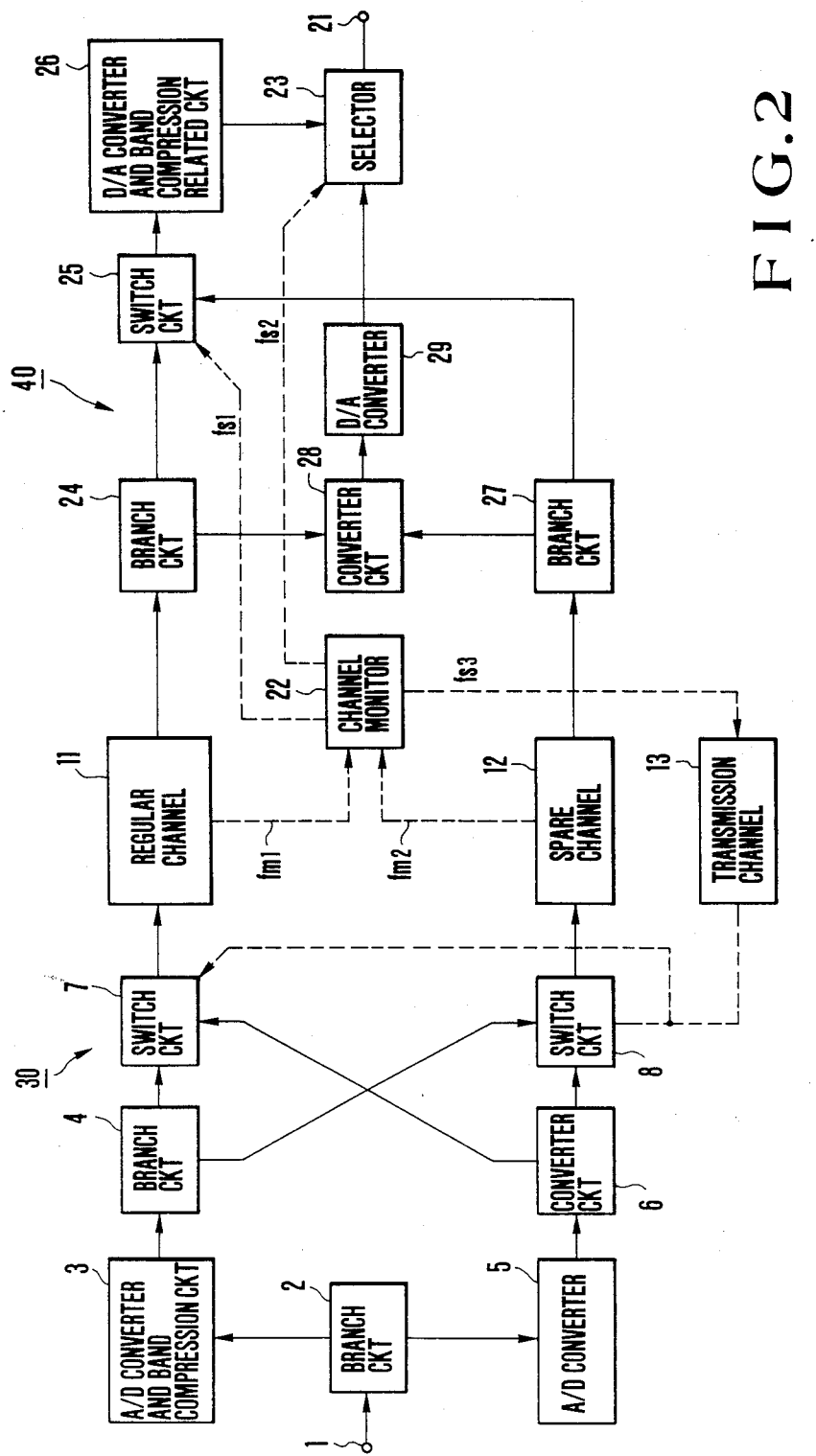
FIG. 2 is a block diagram illustrating a circuit configuration of an embodiment of a radio communication system according to the present invention.

Referring to FIG. 2, there is shown an embodiment of the communication system according to the present invention.

Figure 1:
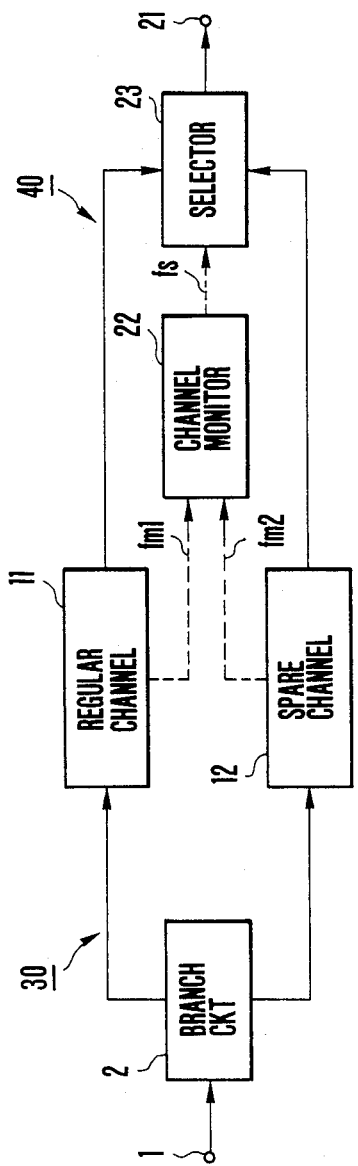
FIG. 1 is a block diagram illustrating a circuit configuration based on a conventional radio relay system provided with a spare channel.

In this communication system, circuit components designated by reference numerals 1, 2, 11, 12, 21, 22, 23, 30 and 40 are substantially identical to those designated by the same reference numerals shown in FIG. 1 and therefore their explanation will be omitted.

The transmitting station 30 comprises circuitry 3 include at its initial stage an analog-to-digital (A/D) converter and band compression circuit for implementing a band compression to digital signal in a manner that its transmission speed is reduced to one-half. A branch circuit 4 distributes the digital signal from the circuitry 3 to two switch circuits, an analog-to-digital (A/D) converter circuit 5. A converter circuit 6 converts the digital signal from the A/D converter circuit 5 into two digital signals each having a one-half of transmission speed. Switch circuits 7 and 8 effect signal switching.

The communication system further comprises a transmission channel 13 for routing a signal in a direction opposite to that of a signal flowing through each of the transmission channels 11 and 12. The receiving station 40 comprises a branch circuit 24 for branching a signal routing through the transmission channel 11 to two circuits. A branch circuit 27 branches a signal routed through the transmission channel 12 to the last-mentioned two circuits. A switch circuit 25 effects signal switching. Circuitry 26 includes a digital-to-analog (D/A) converter and a circuit relevant to a band compression. A converter circuit 28 converts two data signals into a single data signal, and feeds a digital-to-analog (D/A) converter circuit 29. Reference numerals $f_{s1}$, $f_{s2}$ and $f_{s3}$ denote command signals which are output from the channel monitor 22 comprised of the logic circuit to the respective switch circuits 25, 23, and 7 and 8, respectively. The command signal $f_{s3}$ is linked to the circuits 7 and 8 via the transmission channel 13.

First, in the case where both the regular and spare channels are in normal conditions and therefore a signal is transmitted by using both of the channels without implementing band compression, a signal flows via the following route.

An incoming signal passes through the input terminal 1, the branch circuit 2 and the A/D converter circuit 5 and then branches into two signals through the converter circuit 6. One of the branch signals passes through the switch circuit 7 (transferred under the control of command signal $f_{s3}$), the transmission channel 11, and the branch circuit 24 to reach the converter circuit 28. The other signal passes through the switch circuit 8 (transferred under the control of command signal $f_{s3}$), the transmission channel 12, and the branch circuit 27 to reach the converter circuit 28. In the converter circuit 28, two data signals are converted into a single data signal to reach the output terminal 21 via the D/A converter circuit 29 and the switch circuit 23.

In this case, the signal transmission is such that an incoming signal is converted into two signals each having one half of the transmission speed without implementing band compression to the incoming signal to allow the two signals to pass through two transmission channels, respectively. Thereafter, the two signals are rearranged into a single signal. Thus, this makes it possible to transmit a signal having a higher quality as compared to the quality of the signal transmission effected with a single transmission channel.

On the contrary, in the case where a transmission of a signal subject to band compression is effected, a signal flows via the following route.

An incoming signal passes through the input terminal 1, the branch circuit 2, and A/D converter and band compression circuit 3 to reach the branch circuit 4 for branching into two signals. One of the branch signals passes through the switch circuit 7, the transmission channel 11, and the branch circuit 24 to reach the switch circuit 25. The other branch signal passes through the switch circuit 8, the transmission channel 12 and the branch circuit 27 to reach the switch circuit 25. In this switch circuit 25, a signal is transmitted through either route which is selected. The signal thus selected passes through the D/A converter and band compression relevant circuit 26, and the switch circuit 23 to reach the output terminal 21. Accordingly, when a band compressive transmission is effected, only one of the two transmission routes contributes to a signal transmission. That is, because a band compression is implemented to a signal which is to be transmitted, it is possible to complete the transmission of the information of the incoming signal by using a single channel.

Accordingly, in the event that a failure occurs in either of the transmission routes 11 and 12, the channel monitor 22, comprised of the logic circuit, becomes operative in response to monitor signals $f_{m1}$ and $f_{m2}$ to produce command signals $f_{s1}$, $f_{s2}$ and $f_{s3}$ for switching the switch circuits 23, 25, 7 and 8, respectively. Thus, a signal subject to band compression is transmitted via a transmission channel placed in a normal condition which is either of the transmission channels 12 and 11.

In the above-mentioned embodiment, the communication system is provided with one regular channel and one spare channel. However, the present invention is not limited to this embodiment. It will be seen that the present invention is applicable to the system provided with an m number of regular channels ($m \geq 2$) and a p number of spare channels ($p \geq 1$).

For a better understanding of the band compression, data transmission speed conversion and channel switching, reference should be made, for example, to "Transmission Systems for Communications" (Fifth edition, 1982) by Members of the Technical Staff, Bell Laboratories, "Data Transmission" by William R. Bennett et al, Bell Telephone Laboratories, (particularly, a definition of serial transmission is given and parallel transmission at page 20, serial-to-parallel and parallel-to-serial conversion at page 201, an example of serial-to-parallel conversion at page 202, FIG. 10.1, and an example of parallel-to-serial conversion at page 203, FIG. 10.3), and "Microwave Communication" edited by S. Yonezawa et al, 1963.

Further, the abovementioned embodiment has been described as having a signal which is an input to the transmitting station and an output from the receiving station in an analog form. However, as long as a band compression can be implemented to an input signal, the present invention is clearly applicable to the case where an input and output signal has a digital form.

As described above, the radio communication system according to the present invention makes it possible to transmit a signal having high quality by making use of not only a regular channel but also a spare channel when both the regular channel and the spare channel are in normal conditions and the spare channel serves as an idle channel, and makes it possible to transmit a signal to which band compression is implemented via a non-failed channel which is either of the regular and spare channels, thus maintaining a function primarily rendered as a spare channel.

The radio communication system according to the present invention is advantageous in that it is possible to effectively utilize a spare channel for a signal transmission of high quality while maintaining the essential role of the spare channel.

What is claimed is:

1. A radio communication system comprising:
   a transmitting station for receiving an input digital signal and transmission thereof and a receiving station for receiving a transmitted signal and delivery thereof;
   first and second transmission channels for linking said transmitting and receiving stations;
   band compression means, provided at said transmitting station, for compressing by half the transmission speed of the digital signal;
   converter means, provided at said transmitting station, for converting the input digital signal into two digital signals being each halved in transmission speed; and
   switching means responsive to status of said first and second transmission channels to effect switchover between a first transmission mode for transmission of the output of said band compression means and a second transmission mode for transmission of the outputs of said converter means.

2. A radio communication system as set forth in claim 1, which further comprises band compression related means, provided in said receiving station, for reproducing the input digital signal from the output of said band compression means.

3. A radio communication system as set forth in claim 1, wherein said switching means selects said first transmission mode when one of said transmission channels is in an abnormal condition and said second transmission mode when both said transmission channels are in normal conditions.

4. A radio communication system comprising:
   transmitting and receiving station (30, 40) for digital signals;
   an n number of transmission channels (11, 12) linking said stations (n is a positive integer equal to or more than two), said transmission channels being assigned to at least one regular channel and one spare channel;
   channel monitor means (22) for monitoring whether at least one of said transmission channels is failed or not;
   first selector means (25) provided at said receiving station and responsive to a first command from said channel monitor means to select digital signal routing via each of non-failed transmission channels;
   first means (3) provided at said transmitting station to implement a band compression to said digital information received in said transmitting station in a manner that its transmission speed is reduced to one g-th ($2 \leq q \leq n$);

second means (6) provided at said transmitting station to convert said received digital signal into the q number of digital signals each having one g-th of the transmission speed;

second selector means (7, 8) provided at said transmitting station and responsive to a second command ($f_{s3}$) from said channel monitor means to effect selective operation for making said q number of digital signals route from said second means to said respective transmission channels or for making the band-compression digital information from said first means route to said respective transmission channels, and third means (28) provided at said receiving station to combine together respective digital signals which have routed via said respective transmission channels;

whereby when said channel monitor means recognizes that any one of said transmission channels is not failed, it is operative to deliver said second command to said second selector means to make said q number of digital signal route to said transmission channels, thereby to combine together said q number of digital signals which have routed via said transmission channels in said third means, then delivering the digital information thus combined from said receiving station, while when said monitor means recognizes that at least one of said transmission channels is failed, it is operative to deliver said second command to said second selector means to make the band-compressed digital signal route from said first means to said respective transmission channels and to deliver said first command to said first selector means, thereby to select the band-compressed digital signal routing from each of the non-failed transmission channels in said first selector means, thus delivering each of the band-compressed signals thus selected from said receiving station.

5. A radio communication system as set forth in claim 4, wherein said transmitting station includes a branch circuit for branching of said received digital signal into said first means and said second means.

6. A radio communication system as set forth in claim 4, wherein said first means comprises a band compression circuit and second means is comprised of a converter for converting an input signal to a q number of outputs.

7. A radio communication system as set forth in claim 4, wherein said channel monitor means is comprised of a logic circuit responsive to status signals from said respective transmission channels to produce said first and second commands.

8. A radio communication system as set forth in claim 4, wherein each of said first and second selector means is comprised of a switchover circuit.

9. A radio communication system as set forth in claim 4, which further comprises a signal transmission channel for making said second command route to said second selector means in a direction opposite to that of each digital signal routing via said transmission channels, when said channel monitor means is provided at said receiving station.

10. A radio communication system as set forth in claim 4, wherein said said transmitting station includes a branch circuit for branching of analog signal into said first and second means, each of said first and second means is further provided at its initial stage with an analog-to-digital converter for deriving said digital signal.

11. A radio communication system as set forth in claim 4, wherein each of said first selector means and said third means is provided at its final stage with a digital-to-analog converter.

* * * * *